W. C. FRICK.
APPARATUS FOR WELDING TUBING.
APPLICATION FILED OCT. 22, 1914.
1,192,410.
Patented July 25, 1916.
2 SHEETS—SHEET 1.
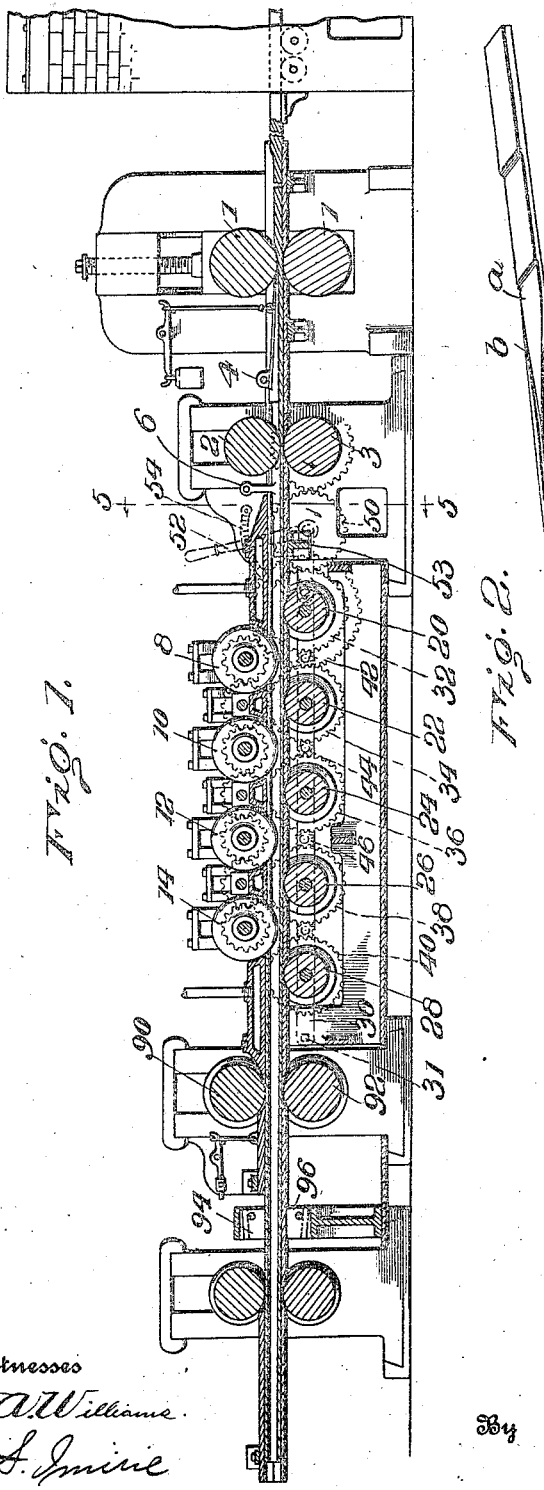
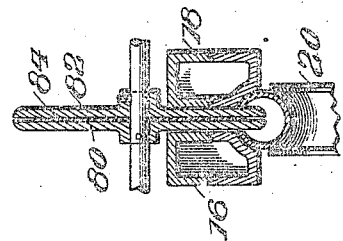
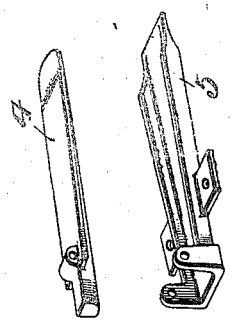

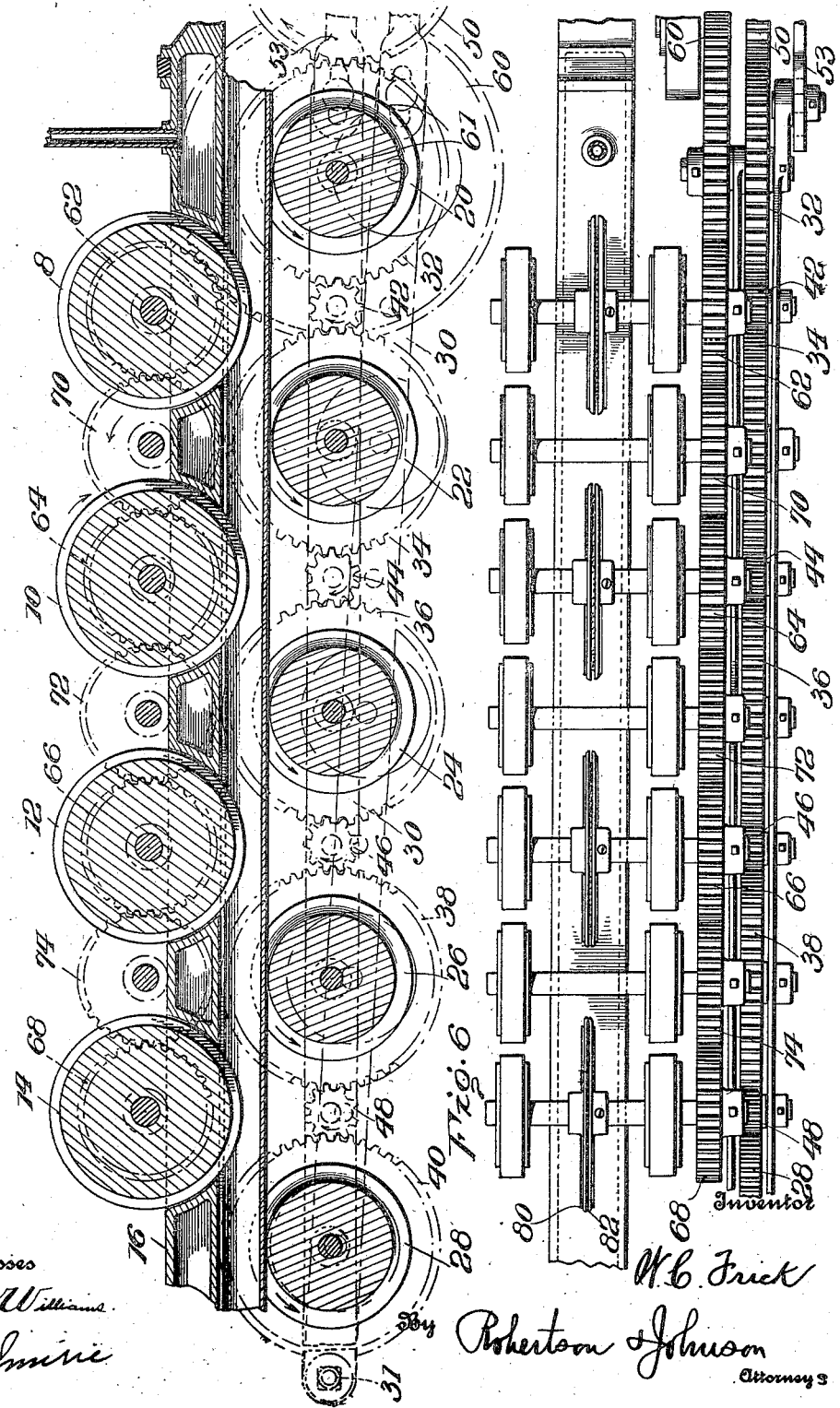

UNITED STATES PATENT OFFICE.

WILLIAM C. FRICK, OF DEAL BEACH, NEW JERSEY.

APPARATUS FOR WELDING TUBING.

1,192,410.  Specification of Letters Patent.  Patented July 25, 1916.

Application filed October 22, 1914. Serial No. 868,064.

*To all whom it may concern:*

Be it known that I, WILLIAM C. FRICK, a citizen of the United States, and a resident of Deal Beach, in the county of Monmouth and State of New Jersey, have invented certain new and useful Improvements in Apparatus for Welding Tubing, of which the following is a specification.

This invention relates to improvements in apparatus for welding tubing such as shown in my U. S. Patents Nos. 989,497, 1,005,764 and 1,005,765. In the aforesaid patents I have shown apparatus for producing tubing by one continuous and progressive method, starting at the point where the metal leaves the rolling mill heating furnace and ending with the finished product in the shape of welded tubing. In the apparatus shown in the aforesaid patents, I employ a succession of heating devices, the first patent referred to showing both gas and electrical heating devices, and the other two patents showing only electrical devices. With these heating devices I augment the heat remaining in the skelp after the rolling thereof, by heating the edges of the tubing at a plurality of places along the path of the tube, until said remaining heat, supplemented by the additional heat, raises the edges of the formed tube, successively and progressively until a welding heat is reached.

In the present invention, instead of using gas or electrical heating devices, I use frictional means for augmenting the heat to successively and progressively raise the heat to the welding point.

My invention consists in the apparatus shown in its preferable embodiment and as will be hereinafter described and claimed.

In the aforesaid drawings: Figure 1 is a sectional view of apparatus showing in conventional form my invention, the apparatus being broken away at the points indicated as will be hereinafter explained. Fig. 2 is a perspective view showing the formation of the tube as it passes through the apparatus. Fig. 3 is a perspective view of several parts detached. Fig. 4 is a sectional detail. Fig. 5 is a vertical section on an enlarged scale of the frictional heating rolls and the means for feeding the tube being welded. Fig. 6 is a top plan of the parts shown in Fig. 5.

Referring now to the details of the drawings by numerals: 1 designates, in conventional form, the last set of rolls of a mill of continuous type, the other three sets not being illustrated. This mill, however, may be of any form and not necessarily the continuous type, since the present invention does not relate to any form of mill, and other means may be substituted for that partially shown in the drawings.

As stated in one of my previous patents, in the preferable embodiment of my invention the billet, as it leaves the furnace, is rolled into shape, and then formed into a tube, or into tube shape, in such a manner as to save as much as possible of the original heat, to which supplemental heat may be successively and progressively added to bring the edges of the formed tube to the welding point, and as the said billet passes through the successive passes of the mill, it is gradually rolled into shape so that by the time it passes out of the last of the four passes, or the pair of rolls 1 of Fig. 1 of my drawings, it is of the shape shown at *a* in Fig. 2. The skelp is now fed forward between the devices 4 and 5 shown detached in Fig. 3 and then passes through the rolls 2 and 3 whereby the tube is formed into U-shape, as shown at *b* in Fig. 2. After passing between the rolls 2 and 3, the U-shaped skelp is now passed around a forming device 6 to bring the skelp almost to tube shape. The device, as so far described, may be of any desired form. After the skelp, which is now practically a tube, passes beyond the member 4, it is acted upon by a series of frictional heating disks 8, 10, 12 and 14, these disks being arranged to pass through two box-like devices 16 and 18, shown in section in Fig. 4, which compress the upper half of the tube. Beneath the box-like devices 16 and 18 are a series of feeding rolls 20, 22, 24, 26 and 28, all of which are carried by a frame 30 pivotally supported at its front end by a suitable bolt 31. These feed rolls 20—28 are provided with gears 32, 34, 36, 38 and 40 which mesh with the idler gears 42, 44, 46 and 48, the first gear 32 being operated from a gear 50 which may be driven from any suitable source of power.

From the foregoing description and the accompanying drawings, it will be seen that each of the rolls 20—28 is driven in the direction of the arrows shown on Fig. 5 so that these rolls perform the double function of supporting the tube in its passage through the mill and also feeding said tube forwardly. The frame 30 which has been described as pivotally supported at 31 is provided with any suitable form of hanger, such as 52, which is adapted to coact with a quadrate 54 and either hold the rolls in their operative position, as shown in full lines in Figs. 1 and 5 or permit the feed rolls and their gears to be slightly lowered as shown in dotted lines in Fig. 5, for the purpose of releasing the tube should it become stuck. For this purpose the hanger 52 is provided with an arm 53 pivotally connecting the hanger 52 with the frame 30 hereinbefore referred to.

The frictional heating disks 8—14 are arranged to be driven at high speed so that the edges of the tube which are each held in frictional engagement with said disks are heated sucessively and progressively until the edges of the tube are brought to welding heat. In order to drive these frictional heating disks, any suitable gearing may be employed, but I have shown in conventional form a large gear 60 connected to the shaft 61 on which is fixed the gear 32 hereinbefore referred to, and this gear 60 meshes with a small gear 62 on the shaft supporting the first frictional disk 8. The other frictional disks 10, 12 and 14 are provided with similar gears 64, 66 and 68 which are driven from the first gear 62 through the idler gears 70, 72 and 74. The frictional disks may be of any desired form and material but I prefer the construction shown in detail in Fig. 4 where the frictional disk is formed of two plates 80 and 82, between which is a filler of mica, asbestos or any similar material 84. It will be noticed that the plates 80 and 82 project beyond the filler of mica or asbestos so that there is an air space between the interior sides of the plates 80 and 82. This construction is designed to prevent overheating of the plates forming the frictional disks 8—14.

After the tube passes through the several disks 8—14, the edges are brought to welding heat and the edges are thereupon closed by means of the closing rolls 90 and 92 and the tube thereupon passes through welding dies of any desired form such as shown at 94 and 96, which crowd the edges together, thereby welding the same.

From the foregoing and accompanying drawings, it will be observed that after the skelp is rolled in the various passes and finally emerges through the rolls 1, the metal is shaped as shown at a in Fig. 2, but in passing through the various passes of the mill the heat has been somewhat reduced and before the tube can be welded, it must have its heat augmented. Therefore, as the tube is fed by means of the feed rolls 20—28 the edges of the tube are forced past the frictional heating disks, 8—14, which, revolving at a high speed, impart successively and progressively, sufficient heat to the already heated edges of the tube to bring said edges up to the welding point so that as said edges are passed through the welding dies, they are fused together.

It will be obvious that changes and modifications may be made in the form and construction of my apparatus without departing from the spirit thereof, and reference should therefore be made to the appended claims to determine the scope of the invention.

What I claim as my invention is:

1. In apparatus of the character described, the combination of means for feeding a slotted tube, and frictional means for heating the edges of said tube as said tube is fed by said frictional heating means.

2. In apparatus of the character described, the combination of means for feeding a slotted tube, and frictional disks, rotatable at high speed, for heating the edges of said tube as said tube is fed by said frictional heating means.

3. In apparatus of the character described, the combination of means for feeding a slotted tube, frictional disks, rotatable at high speed, for heating the edges of said tube as said tube is fed by said frictional heating means, each of said disks having a double periphery, with an air space between the parts thereof.

4. In apparatus of the character described, the combination of means for feeding a slotted tube, frictional disks, rotatable at high speed, for heating the edges of said tube as said tube is fed by said frictional heating means, each of said disks being formed of two plates, with a filling of fire-resisting material between them, said plate having an air space between them at the periphery thereof.

5. In apparatus of the character described, the combination of a series of rollers for feeding a slotted tube, and frictional disks, rotatable at high speed, for heating the edges of said tube as the latter is fed by said rollers.

6. In apparatus of the character described, the combinaton of a series of rollers for feeding a slotted tube, and frictional disks, rotatable at high speed, for heating the edges of said tube as the latter is fed by said rollers, said feeding rollers being carried upon a frame and said frame being adjustable whereby the rollers may be moved out of position.

7. In apparatus of the character described, the combination of a series of rollers for feeding a slotted tube, means for positively driving said rollers, a series of frictional disks located in proximity to said feeding rollers and arranged to project through the slot of the tube, means for positively rotating said disks at high speed, whereby the disks heat the edges of the tube as the latter is fed by said rollers, and a frame for supporting said rollers, said frame being adjustable whereby the rollers may be moved out of position.

In testimony whereof I affix my signature in presence of two witnesses.

WILLIAM C. FRICK.

Witnesses:
J. B. LOGAN,
HOWARD SHEFT.